United States Patent Office 3,553,299
Patented Jan. 5, 1971

3,553,299
PROCESS OF PRODUCING SHAPED OPTICAL BODIES USEFUL AS AIDS TO VISION
Heinrich Thiele, 16 Hardenbergstrasse, Kiel, Germany, and Wilhelm P. Soehnges, 11 Bluetenstrasse, Munich, Germany
No Drawing. Filed Dec. 12, 1967, Ser. No. 690,028
Int. Cl. B29d 11/00, 11/02
U.S. Cl. 264—1
17 Claims

ABSTRACT OF THE DISCLOSURE

Optical lenses useful for replacing damaged or cataractous eye lenses, contact lenses, and other aids to vision are obtained by first preparing a colloidal solution of the peripheral part of animal or human eye lenses or of the lens nucleus of both materials by means of aqueous solutions of acid or alkaline agents or salts such as alkali metal hydroxides, hydroxy carboxylic acids, for instance, lactic acid, tartaric acid, or citric acid, urea and its derivatives, lithium thiocyanate, and others which increase the solubility of the lens substance in water without affecting and denaturating the lens protein.

The resulting sol is then exposed to ion diffusion preferably through ion-permeable membranes in the desired shape whereby a gel is formed. Polyvalent metal ions and preferably copper, cadmium, zinc, and calcium ions are the preferred ions. Electrodialysis or change in the pH-value of the sol by means of hydrogen ions may also be used for gel formation.

The resulting clear and transparent shaped gel with oriented filamentary protein molecules is then stabilized by cross-linking with agents such as formaldehyde, dialdehydes, diepoxides, and the like.

BACKGROUND OF INVENTION

The present invention relates to a process of producing aids useful in improving or restoring vision and more particularly to such aids to vision as contact lenses, lenses for optical correction of the eye and for replacement of the natural eye lens and the like, and to such products useful in improving or restoring vision.

Optical lenses, contact lenses, and other aids to vision have been made of glass and also of plastic material. Lenses made of plastic material have the advantage over glass lenses that they are substantially unbreakable. However, they have the disadvantage that they are not as resistant to atmospheric influences and the action of cleansing agents and the like as glass lenses. Like glass lenses they are products foreign to the human body and, therefore, are not well tolerated when brought in contact with the organism, i.e., the eye. It is well known, for instance, that contact lenses made of plastic material may cause considerable irritation to the eye so that frequently their use is prohibited.

SUMMARY OF INVENTION

It is one object of the present invention to provide a process of producing a material useful in the manufacture of aids to vision such as contact lenses, lenses to replace the damaged or otherwise impaired natural eye lens, and the like, which material is well tolerated by the human eye and is not rejected when implanted into the eye or brought in contact with the eyeball.

Another object of the present invention is to provide contact lenses made of the natural protein of the lenses of eyes of warm-blooded animals, said contact lenses having no irritating effect when contacting the eyeball.

A further object of the present invention is to provide reconstructed lenses to be implanted into the eye in place of a damaged or otherwise impaired eye lens, said reconstructed lenses not being rejected, not being reabsorbed by the human body, and not causing irritation or other side-effects.

Other objects of the present invention and advantageous features thereof will become apparent as the description proceeds.

In principle the process of producing material useful in the manufacture of aids to vision, such as contact lenses and lenses for replacing damaged or otherwise impaired natural eye lenses, comprises the following steps.

(a) Preparatory step

Human or animal eye lenses are removed histologically from the eye. They are freed of adhering vitreous body (Corpus vitreum or vitreous humor) and of ciliary ligament or body and are decapsulated, i.e., separated from their elastic capsule and suspensory ligaments. The decapsulated lenses are then mechanically separated into their outer or peripheral shells or layers and their inner nuclei (nuclei lentis), i.e., the more difficultly soluble dense inner parts of the crystalline eye lenses. Mechanical separation of the more liquid peripheral part of the lens from the more solid inner part or nucleus of the lens may, for instance, be effected by shaking the eye lenses on a coarse sieve. Such separation may also be effected by the action of suitable solvents which are capable of partly dissolving the outer layer and thus separating it from the nucleus. Suitable solvents are, for instance, urea, lithium thiocyanate, alkali metal hydroxide solutions, or organic solvents such as polyalcohols. Of course, only such dissolving agents and solvents can be used which do not cause any substantial denaturation of the proteins.

As structural material for reconstructing and regenerating aids to vision according to the present invention, there may be used the outer layer or shell of the eye lens as well as its nucleus.

(b) Preparations of aids to vision from the lens nucleus (1) When using the nucleus or inner part of the lens as starting material, it is carefully dehydrated under such conditions, at such a temperature and pressure, and so slowly that the water is able to diffuse from the interior of the nucleus to the outside without causing the formation of cracks, fissures, holes. Thereby it is the preferred procedure to keep the moisture differential between the gel of the nucleus and the surrounding atmosphere as low as possible. The dehydrating temperature may be between about 10° C. and about 40° C. The water content of the dehydrated nuclear part of the lens should be at least 10%. A water content substantially lower than 10% will cause the dehydrated material to become brittle and thus to break and become readily crushed on subsequent molding. The resulting dehydrated lens nucleus material has a water content between about 10% and about 40% and preferably between about 10% and about 20%. It is transparent and colorless. It corresponds in its chemical composition to the protein the crystalline lens. It is soluble, although slowly, in weak alkaline, weak acid, urea, and lithium thiocyanate solutions, and in mixtures thereof. The dehydrated material represents the raw material for reconstructing the aids to vision according to the present invention. Careful dehydration under the conditions described above does not cause irreversible change of state of the protein. As a result thereof disintegration of the structure of the lens nucleus material is avoided.

(2) The dehydrated material obtained as described hereinabove is molded into the optical article of the desired shape, for instance, into the shape of contact lenses or lens replacements and others. Such shaping may be effected by means of suitable cutting or machining tools. The preferred procedure, however, is to mold the dehydrated material under pressure in suitably shaped molds. Pressure, duration of molding, and temperature during molding may be varied depending upon the composition of the respective dehydrated material and/or its water content and can readily be determined by preliminary experiments for each type of starting material and for each shape and use of the molded bodies. The molding pressure may be between about 20 kg./sq. cm. and about 50 kg./sq. cm. and the molding temperature between 20° C. and 70° C. The resulting transparent and clear molded articles may be shaped in such a manner that they possess the desired inner and outer curvatures, i.e., the desired refractive index. It is readily possible, for instance, to produce replacement lenses or contact lenses with the refractive index of the natural lens, namely with a refractive index of 1.38, i.e., the refractive index at the periphery of the lens, or with a refractive index of 1.41, i.e., the refractive index of the lens nucleus. However, it is also possible to produce transparent molded optical bodies with a refractive index of 1.47 to 1.48 from the protein of the eye lens, i.e., very near to the refractive index of the synthetic plastic material used heretofore for visual aids to vision, namely the polymerized methyl methacrylate sold under the tradename "Plexiglas." Thus it is possible to produce molded optical bodies of different curvatures, refractive power, and other optical data and to keep such bodies, lenses, contact lenses, and the like in stock and on hand.

(c) Preparation of articles aiding vision from the lens shell or peripheral part of the eye lens (1) When using as starting material the protein of the outer shell or layer of the eye lens, i.e., the more liquid peripheral lens substance, this material is first dissolved in aqueous solutions of suitable dissolving agents such as acids, for instance, pyruvic acid, lactic acid, tartaric acid, citric acid, and the like hydroxy carboxylic acids, or alkaline agents, for instance, lithium hydroxide, sodium hydroxide, potassium hydroxide, ammonia, urea, thiourea, and their alkyl derivatives, and the like, or salts, for instance, lithium thiocyanate and others. Said dissolving agents may also be used in mixture with each other. Of cource, only dissolving agents and solvents can be used which do not cause any substantial denaturation of the protein and which do not in any way affect and/or attack the lens shell material. Initially these dissolving agents cause swelling of the eye protein. The swollen protein is then dispersed mechanically and dissolved to form a colloidal solution or paste. Preferably such mechanical dispersion and dissolution is carried out at room temperature. The most suitable concentrations of said dissolving agents and solvents can readily be determined by simple preliminary tests. Preferably 0.01 N to 2.0 N solutions are used. Urea may be employed in higher concentrations up to 6.0 N solutions. Rather concentrated solutions or colloidal sols of the peripheral lens substance which are clear and substantially free of degraded, denaturated protein, are obtained in this manner.

Of course, it is also possible to produce clear solutions or pastes of the nuclear lens substance or of the entire lens protein and to use such solutions and/or pastes in the following gel-forming steps.

(2) For reconstructing the lens material, the resulting colloidal solution containing the proteins of the outer shell or peripheral layer of the eye lens or the proteins of the nucleus of the eye lens or both types of proteins, is converted into a gel by allowing gel-forming ions to diffuse thereinto. Thereby, first orientation of the gelled filamentary protein takes place which, therefater, solidifies to a transparent, clear gel. Of course, care must be taken that only such diffusing ions are allowed to act on the solution which do not cause denaturation of the protein. Elasticity and strength characteristics of the resulting gel may be increased and improved by allowing the compensating ions or "gegenions" to diffuse periodically in so-called ion waves. Preferred compensating ions are ions of polyvalent metals, especially of calcium, cadmium, zinc, and copper as well as hydrogen ions. The metal ions are supplied by using metal salt solutions, especially metal nitrate solutions. Once the final structure of the gel is formed, the metal ions can be exchanged by hydrogen ions without any substantial change in the structure and orientation of the gel. Only very small ion concentrations, comparable to those of trace elements, are necessary for gel formation.

Diffusion of the ions into the solutions preferably takes place through suitable membrances which are permeable to the ions and which are provided in the shape of the desired molded body. The solutions are placed into such membranes which have, for instance, the shape of the eye lens, and the ions are allowed to diffuse from the outside into the solution, thereby solidifying the same to the desired shaped gel consisting of oriented filamentary molecules as present in the native eye lens.

Gel formation may also be effected by dialysis and electrodialysis, preferably in a three-cell electrodialyzer according to Thiele and Lange "Kolloid-Zeitschrift," vol. 169, p. 86 (1960), and/or by changing the pH-value of the sol.

The membranes used for ion diffusion or in the electrodialyzer are composed of any substantially inert, ion-permeable membrane material, for instance, of cellulose esters, such as cellulose acetate, cellulose nitrate, of alginates, or the like which can readily be shaped to the desired mold. It is, of course, also possible to produce a body of the eye protein gel in the form of a block or a plate and to cut therefrom by mechanical means the desired shaped bodies such as lenses for replacing the native eye lenses, as contact lenses, and the like.

(3) Thereafter the resulting shaped gels are gradually dehydrated and preferably irreversibly cross-linked. By such a treatment they are rendered resistant to aqueous solutions and liquids and to the action of the atmosphere. Such cross-linking and stabilizing may be effected by using water-soluble cross-linking agents such as short-chain aldehydes, preferably formaldehyde, or $\alpha,\omega$-dialdehydes, such as glutar dialdehyde, 1-hydroxy adepic dialdehyde ethers. The aldehydes and dialdehydes are employed together with amines, preferably with polyvalent amines such as triethylene diamine and others. It is, of course, also possible to add, during gel formation, agents which subsequently can be converted into cross-linking agents, for instance, hexamethylene tetramine and to initiate cross-linking after the gel has been formed. In this manner uniform distribution of the cross-linking agent throughout the gel is readily achieved.

The resulting shaped gel bodies according to the present invention can be used as optical aids to vision to replace the eye lenses when removed by operation, for instance, to restore vision lost through cataract. Biconvex lenses obtained according to the present invention are implanted immediately after operative removal of the cataractous lens. The lens capsule must remain intact during operation. By selecting a biconvex lens with the required optical characteristics reconstructed according to the present invention, it is thus possible to restore vision to persons afflicted with cataract. Preferably the optical data of the lens to be removed are measured before the operation and the reconstituted lens is selected according to said data from a set of lenses of different characteristics prepared according to the present invention. If at a later time the patient with the implanted lens should become near- or far-sighted, it is readily possible to compensate for such hypo- or hyperfunctioning of the lens by operatively exchanging the improper lens by an optically correct lens which is implanted into the protein chamber of the eye.

The gel according to the present invention can also be produced in convexconcave shape to be fitted as contact lens to the front of the eyeball. These contact lenses may have different optical characteristics so that they can be kept in stock and can be selected as required in order to correct the respective refractive error.

DETAILED DESCRIPTION OF INVENTION

The following examples serve to illustrate the present invention without, however, limiting the same thereto.

Example 1

The lenses are removed from 50 eyes of recently slaughtered hogs under proper hygenic conditions and are decapsulated. The more liquid peripheral part of said lenses is then separated from the more solid inner part or nucleus of said lenses by shaking on a coarse sieve. The nuclear part of the lenses is slowly and gradually dried at a temperature of 40° C. in an atmosphere the humidity of which is gradually reduced in such a manner that it is at any given moment only a fraction below the water content of the nuclear lens material. When proceeding in this manner and carefully drying the lens material, a dried gel of a solids content of about 80% which is free of cracks, fissures, and holes is obtained. The resulting dried gel in which substantially no denaturation of the protein has taken place and which contains the protein in the form of its natural oriented filamentary molecules is then molded by pressing it in a biconvex lens-shaped form or in a concavoconvex contact lens form at a temperature of 20–70° C. and under a pressure of about 35 kg./sk. cm. until a fully transparent, solid molded body of the desired optical refractive index is obtained. The resulting molded bodies are stabilized and kept in stock until used as contact lenses or for implantation in the place of operatively removed cataractous lenses.

Example 2

The separated peripheral part of the 50 lenses used in Example 1 is dialyzed against distilled water until free of dialyzable components. The dialyzed material is then placed into an aqueous urea solution and is homogenized therein yielding a clear viscous sol or paste of a solids content of 10% to 60%. Any undissolved matter is removed by centrifuging.

The sol is filled into an ion-permeable cellulose acetate membrane having the shape of the desired lens or contact lens. The cellulose acetate membrane mold is immersed into an aqueous 0.1 N cadmium nitrate solution. Diffusion of the cadmium ions through the porous membrane gradually builds up an ionotropic clear and fully transparent gel in which the fibrillas and bundles of fibrillas of the lens protein are oriented and form the desired anisotropic gel structure. As soon as gel formation is completed, the membrane mold is removed from the cadmium nitrate solution and is placed into an 0.1 N citric acid solution. By repeatedly changing the citric acid solution, the cadmium ions are exchanged against hydrogen ions. Excess hydrogen ions are removed by subjecting the gel to dialysis or electrodialysis. The resulting lens-shaped gel consists of a body of oriented filamentary protein molecules.

Example 3

The procedure is the same as described in Example 2. However, in place of the peripheral part of lenses of eyes of hogs, there is used the peripheral part of the lenses of eyes of cattle, in place of lithium thiocyanate solution an aqueous 0.1 N lithium hydroxide solution, and in place of cadmium nitrate solution, an aqueous N cupric nitrate solution. The mold is composed of an ion-permeable alginate membrane.

Example 4

The procedure is the same as described in Example 2. However, in place of the peripheral part of lenses of eyes of hogs, there is used the peripheral part of the lenses of eyes of horses, in place of lithium thiocyanate solution an aqueous N lactic acid solution, and in place of cadmium nitrate solution, an aqueous N zinc chloride solution. The mold is composed of an ion-permeable cellulose nitrate membrane.

Example 5

The procedure is the same as described in Example 2. However, in place of the peripheral part of lenses of eyes of hogs, there is used the peripheral part of the lenses of eyes of cattle, in place of lithium thiocyanate solution an aqueous 15% urea solution, and in place of cadmium nitrate solution, an aqueous 0.1 N calcium chloride solution. The mold is composed of an ion-permeable pectinate membrane.

Example 6

20 decapsulated lenses of cattle are placed into an aqueous 0.1 N sodium hydroxide solution and the mixture is homogenized by stirring, thereby yielding a clear viscous sol of a solids content of 20%. This sol is freed of undesired components which might unfavorably affect gel formation, by dialysis against distilled water and is centrifuged.

Glycerol is added to the sol in an amount of 15% of the sol and the resulting mixture is filled into the middle chamber of a three-cell electrodialyzer according to Thiele. The membranes forming said middle chamber are shaped so that they impart to the resulting gel the shape of the desired biconvex lens or concavoconvex contact lens. On applying thereto a direct current voltage of 5 volts, the electrolytes and a considerable part of the water are removed and the sol is converted into a clear ionotropic gel of the desired shape.

Example 7

Cross-linking and stabilizing lenses as produced according to the preceding examples is carried out by immersing the lens into a 50% aqueous solution of glycerol containing 0.4% formaldehyde at 25° C. for about 6 days. The mixture of glycerol and formaldehyde is changed every 8 hours whereby the formaldehyde content is increased by 0.1% each time the solution is changed. The final formaldehyde solution contains about 2.0% of formaldehyde. Thereafter excess formaldehyde is removed, and the gel is kept humid.

In place of glycerol, there may be used other polyhydric alcohols such as ethylene glycol, or polyglycols while formaldehyde may be replaced by other cross-linking agents as mentioned hereinabove.

Of course, many changes and variations in the starting eye lens material, in the solubilizing agents, the gel-forming agents, and the cross-linking and stabilizing agents used, in the conditions, temperature, and duration employed for dissolving the natural starting material, for forming the ionotropic gels, in the manner in which the reconstituted lens material is shaped, and the like may be made by those skilled in the art in accordance with the principles set forth herein and in the claims annexed hereto.

We claim:

1. In a process of producing shaped optical bodies useful as aids to vision, the steps which comprise:
    (a) dissolving lenses of eyes of warm-blooded animals and humans in aqueous solutions of agents increasing the solubility of the lens proteins but without detrimentally affecting and denaturing the same,
    (b) causing gel-forming ions to diffuse into the resulting colloidal solution to produce an ionotropic gel with oriented filamentary protein molecules,
    (c) shaping the gel to the shape of the desired optical body useful as aid to vision, and
    (d) partly dehydrating and corss-linking the shaped gel.

2. The process according to claim 1, wherein in step (a) the peripheral part of the lenses is used for preparing a colloidal solution therof.

3. The process according to claim 1, wherein in step (a) the agents increasing the solubility of the lens protein are agents selected from the group consisting of acids, alkaline agents, urea and its derivatives, and salts which are capable of increasing the solubility of the lens protein but without detrimentally affecting and denaturnig the same.

4. The process according to claim 3, wherein the acids are selected from the group consisting of lactic acid, tartaric acid, citric acid, and pyruvic acid.

5. The process according to claim 3, wherein the alkaline agents are the hydroxides of the alkali metals.

6. The process according to claim 3, wherein the salt is lithium thiocyanate.

7. The process according to claim 1, wherein in step (b) the ions of polyvalent metals are caused to diffuse into the colloidal solution.

8. The process according to claim 7, wherein the ions of polyvalent metals are selected from the group consisting of copper, cadmium, zinc, and calcium ions.

9. The process according to claim 1, wherein in step (b) hydrogen ions are caused to diffuse into the colloidal solution to form the ionotropic gel.

10. The process according to claim 1, wherein in step (b) gel formation is effected by removing the solubilizing agent by the action of an electrical field.

11. The process according to claim 1, wherein in step (b) gel formation is effected by removing the solubilizing agent by diffusion.

12. The process according to claim 1, wherein gel formation in step (b) and shaping to the desired optical body in step (c) are carried out simultaneously by placing the colloidal solution into an ion-permeable membrane of the desired shape and allowing the gel-forming ions to diffuse through said shaped membrane.

13. The process according to claim 1, wherein gel formation in step (b) and shaping to the desired optical body in step (c) are carried out simultaneously by causing the solubilizing agents to diffuse out of the sol.

14. The process according to claim 12, wherein the ion-permeable membrane is composed of a material selected from the group of cellulose esters, alginates, and pectinates.

15. The process according to claim 1, wherein in step (d) cross-linking is effected by immersing the shaped optical body into a dilute formaldehyde solution in polyalcohols.

16. The process according to claim 1, wherein in step (d) cross-linking is effected by immersing the shaped optical body into a dilute solution of a cross-linking agent selected from the group consisting of dialdehydes, diepoxides, and diglycidol ethers of diepoxides.

17. The process according to claim 1, wherein an agent being convertible into cross-linking agent is added during gel formation in step (b) and is converted after shaping into the cross-linking agent to cause cross-linking of the gel.

References Cited

UNITED STATES PATENTS 3,408,659    11/1968    Thiele et al.    351—160UX

FOREIGN PATENTS 918,626    2/1963    Great Britain    351—160

OTHER REFERENCES

Troutman, Artiphakia and Aniseikonia, vol. 56, No. 2, pp. 602–639, October 1963.

ROBERT F. WHITE, Primary Examiner

A. M. SOKAL, Assistant Examiner

U.S. Cl. X.R.

3—1, 13; 351—160, 167